June 28, 1955     W. E. BAKER     2,711,654

MOTION TRANSMITTING MEANS

Filed Sept. 26, 1951

INVENTOR.
WILLIAM E. BAKER
BY
C. R. Miranda
ATTORNEY

United States Patent Office 2,711,654
Patented June 28, 1955

2,711,654

MOTION TRANSMITTING MEANS

William E. Baker, Waldwick, N. J., assignor to Bendix Aviation Corporation, Teterboro, N. J., a corporation of Delaware Application September 26, 1951, Serial No. 248,427

1 Claim. (Cl. 74—99)

This invention relates to pressure responsive devices, and more particularly to novel means for transmitting motion through a pressure-tight wall.

The present invention is an improvement over the means for transmitting motion through a pressure-tight wall shown and described in U. S. Patent No. 2,260,766, issued October 28, 1941.

Heretofore, pressure responsive devices of the type disclosed in the aforenoted patent used a sealing bellows which was deflected about a fixed center inside the bellows. The fixed center was obtained by using two pivot bearings and pivots. The bellows formed part of the pressure-tight wall which separated a pressure chamber from a chamber containing indicating and/or motion transmitting mechanism. Motion of a pressure sensitive element in the pressure chamber was transmitted through the pressure-tight wall by way of the sealing bellows to rock a suitable arm secured thereto. The arrangement was unsatisfactory from the standpoint of cost and maintenance.

In the case of manifold pressure gauges and differential pressure gauges, one of which is described in detail in the above-mentioned patent, the sealing bellows serves to prevent contact of the gauge mechanism with corrosive vapors from the manifold and fuel pressure lines, and to transmit motion of the pressure element to the indicator. As is well known, the manifold pressures being measured often contain fluids other than a true gas, as for example, gasoline, oil and water vapor. Intermingling and contact of these foreign vapors tends to produce deleterious effects upon the mechanism causing corrosion and consequent inaccuracy of the indicator.

The present invention therefore, contemplates means for transmitting motion of a pressure sensitive element in a pressure chamber through a pressure-tight wall to actuate a signal transmitter and/or indicator. The motion transmitting means comprises a novel sealing bellows forming part of the pressure-tight wall and includes a bellows arm having one end fastened to the closed end of the bellows. Arranged parallel to and along the longitudinal axis of the bellows and diametrically opposed, are a pair of bellows deflection restraining means or wires secured to the outside surfaces of the bellows. A yoke member is fastened to the closed end of the bellows and is connected to the pressure sensitive element, whereby deflections of the pressure element effects pivoting of the bellows arm about an axis normal to the longitudinal axis of the bellows. Each wire is soldered, or fastened, in any suitable manner to the two ends of the bellows and to each corrugation thereof to shorten the unsupported length of the wires thereby preventing the wires from buckling under a compression load. With the above arrangement, the sealing bellows will not deflect in any direction except perpendicular to the plane containing the wires.

An object of the present invention, therefore, is to provide a novel motion transmitting bellows wherein rocking motion of a bellows arm associated therewith is accomplished without the requirement of bearings and related parts.

Another object is to provide for controlled rocking of a motion transmitting bellows and a bellows arm in a single plane.

A further object is to provide a sealing bellows having a pair of wires secured to opposite sides thereof so that a force applied to one end of the bellows effects compression of half of the bellows and expansion of the other half.

Still another object is to provide a corrugated motion transmitting bellows having a yoke fastened to one end thereof and a pair of diametrically opposed wires secured to the wall of the bellows, the bellows, yoke, and wires defining a cantilever for the purpose of rocking a bellows arm secured within the bellows.

The above and other objects and advantages of the present invention will appear more fully hereinafter from a consideration of the detailed description which follows, taken together with the accompanying drawing wherein one embodiment of the invention is illustrated.

In the drawing, wherein like reference characters refer to like parts throughout the several views.

A problem arising with the old type of pressure transmitters and gauges has been the deterioration and corrosion of the motion transmitting means and indicating mechanism due to the direct contact of manifold vapors, moisture, and dust with the mechanism. The present invention contemplates the provision of separated sealed chambers so as to isolate the manifold pressures or fuel pressures and the delicate indicating mechanism from each other without interfering in any way with the transmission of motion from the pressure chamber to the chamber containing the mechanism or signal generator. Novel motion transmitting means are provided in the form of a bellows for transmitting the deflection of a pressure sensitive element in the pressure chamber to a signal transmitter, and for preventing any undesirable leakage of vapors from affecting the transmitter. Where the instrument is to be used as a differential fuel pressure indicator and/or transmitter, the diaphragm in the pressure chamber will respond to fuel pressure at its interior and the supercharger or auxiliary pressure will communicate with the outside of the diaphragm. The difference in pressures will actuate the diaphragm and such movement is transmitted to an indicating member or signal transmitter.

Figure 1:
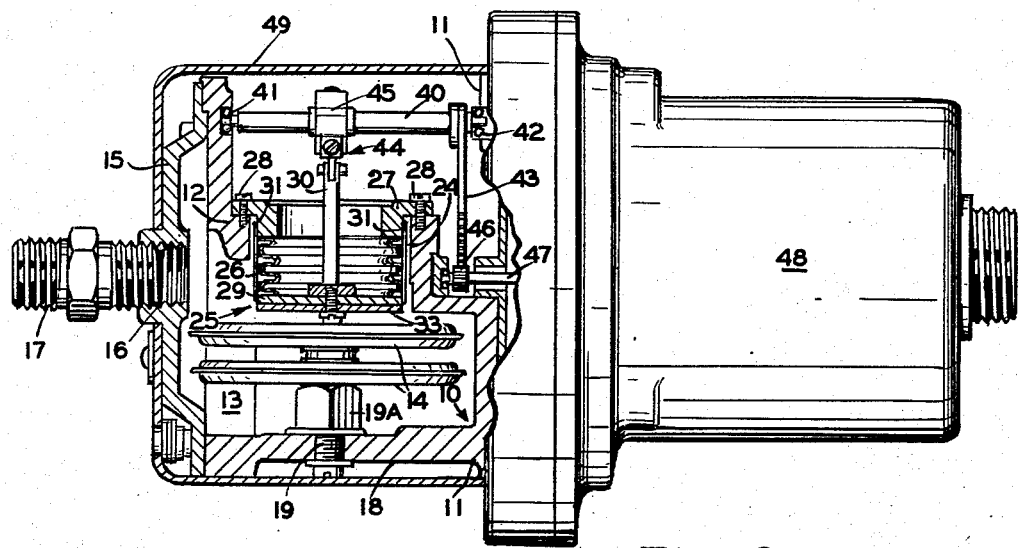
Fig. 1 is a side elevational view, in section, of one form of a pressure responsive transmitter embodying the present invention.
Figure 2:
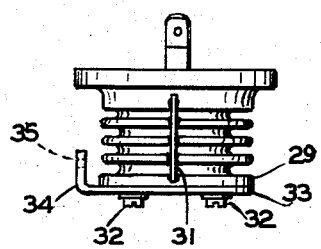
Fig. 2 is a side elevational view of the novel motion transmitting bellows used with the transmitter of Fig. 1.

Referring now more particularly to the drawing for a detailed description of one embodiment of the invention, Fig. 1 illustrates, by way of example, a manifold pressure transmitter having an inner casing 10 provided with circular end flanges 11 and a substantially semispherical intermediate portion 12. The intermediate portion is closed at its top end to form a variable pressure chamber 13 containing the pressure responsive diaphragm or pressure sensitive element 14, which in the present embodiment, is shown as a pair of aneroid capsules providing evacuated sealed chambers. The hollow rear flange 11 of the casing is pressure sealed by means of a circular back plate 15 and the latter is provided with a boss having a threaded opening 16 adapted to receive a conduit 17 communicating with the manifold intake of an engine (not shown) in any well known manner. As will readily appear, pressure conditions of the engine are thus transferred to the variable pressure chamber 13. The bottom of the casing 10 is provided with a flat portion 18 forming a base for the diaphragm 14 the latter being rigidly secured to the base by means such as a screw 19 and stud 19a.

Coming now to the novel arrangement of the present invention, the closed top portion of casing 10 is formed with an opening 24 adapted to receive the novel motion transmitting bellows seal, indicated generally at 25, which serves to transmit motion of pressure element 14, as well be described hereinafter, and further, prevents passage of pressure from or into pressure chamber 13. The seal comprises a metallic bellows 26, the upper end of which includes a flanged member 27 sealed to the uppermost corrugation. Flange 27 has an opening formed therein substantially coincident with the inside diameter of the bellows and is secured to a shoulder on casing 10, as by screws 28. The bottom of the bellows includes a circular sealing plate 29 which seals the interior of the bellows from the pressure chamber. Disposed within the bellows and partially extending outside thereof is a T-shaped bellows arm 30, the axis of which coincides with the longitudinal axis of the bellows. Arm 30 is bifurcated at one end while the bottom thereof is fastened to plate 29.

Arranged parallel to and along the longitudinal axis of the bellows and diametrically opposed, are a pair of bellows deflection restraining means, such as wires 31, which are soldered to flange 27 and plate 29, and to each corrugation of the bellows. Wires 31 restrain deflection of the bellows and movement of the arm to a direction perpendicular to the plane containing the wires and prevent axial movement of the bellows. The wires are fastened to each corrugation, to flange 27 and to plate 29 so that the unsupported length of wire is shortened, thereby preventing the wires from buckling under a compression load. In this manner, columns are formed between the corrugations to maintain the latter in a fixed position along the points of attachment of the wires to the corrugations.

Figure 3:
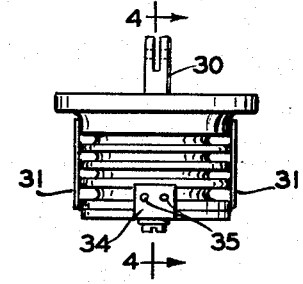
Fig. 3 is a front elevational view of the bellows.
Figure 4:
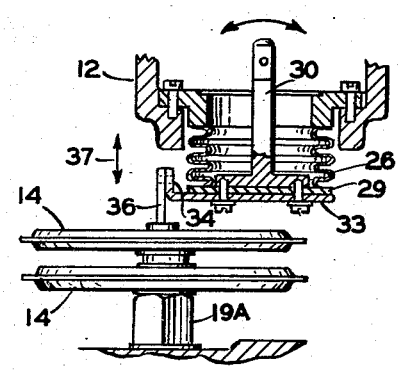
Fig. 4 is a section taken on line 4—4 of Fig. 3 and includes the connection between the bellows and pressure sensitive element.

Rigidly secured to plate 29 by screws 32 is a substantially circular yoke or motion receiving means 33 having an upturned extension 34 at its outer periphery provided with openings 35. A flexible tension member 36 (Fig. 4) is secured at its one end to aneroid diaphragm 14 and at its upper end to extension member 34. As shown in Fig. 3, extension member 34 is located midway between wires 31 and reciprocating motion of pressure element 14, due to variation in pressure in the chamber, urges member 34 in the direction of arrows 37. As a result, one half of the bellows will be compressed while the other half will be expanded, thus providing for rocking movement of bellows arm 30. It may be readily understood that rocking movement of the arm is effected because of the diametrically opposed arrangement of the wires on bellows 26. Furthermore, yoke 33 together with wires 31 and bellows 26, define a cantilever to effect rocking of arm 30 in a plane normal to the plane containing the wires and about an axis normal to the longitudinal axis of the bellows.

Mounted upon the inner surfaces of circular end flange 11 of inner casing 10 is a rock shaft 40 journalled for rotation in bearings 41 and 42 and having secured thereto a gear sector 43 at one end. Interconnecting rock shaft 40 and the bifurcated portion of arm 30 are connecting means 44 and a block member 45 secured to the rock shaft. Further description of means 44 and block 45 is believed unnecessary, it being understood that any conventional interconnecting means may be employed. Gear sector 43 is adapted for meshing engagement with a pinion 46 fastened to the rotor shaft 47 of a signal transmitter (not shown), the outer casing 48 enclosing the transmitter. The signal transmitter may be connected with a remotely located signal receiver in an indicator so as to effect indications of pressure in the pressure chamber. A cup-shaped casing 49 is provided for the transmitter and is secured at its open end to front flange 11 of inner casing 10 in any suitable manner. It is to be understood that the pressure transmitter may be readily adapted for use as an indicator by removing the signal transmitter and substituting therefor an indicator pointer and dial.

From the foregoing, it is apparent that the present invention provides means for transmitting motion through a pressure tight wall and consists of a novel motion transmitting bellows of relatively few parts. The utilization of a pair of diametrically opposed wires coplanar with the longitudinal axis of the bellows to form a cantilever provides for an efficient and inexpensive motion transmitting means and dispenses with the requirement of bearings.

It is to be expressly understood that any suitable bellows deflection restraining means such as flat strips, may be substituted for wires 31. The main consideration is that the wires or strips should be strong enough in tension to withstand axial movement of the bellows due to differential pressures thereon.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

Motion-transmitting apparatus for displacing the movable part of a signal transmitting device, said apparatus comprising a flexible corrugated bellows having an open fixed end and a closed movable end, a motion-transmitting arm having one end secured to said closed movable end of the bellows and having the other end adapted to be coupled to the movable part of the signal transmitting device, a motion-receiving member secured to said closed movable end of the bellows and having a portion extending beyond the periphery of said bellows and constructed to receive motion at a fixed point of application longitudinally of and offset from the bellows axis for displacing the bellows and for pivoting the arm, and a pair of diametrically opposed deflection-restraining elements extending substantially parallel to the bellows axis between said fixed and movable ends of said bellows and attached to said fixed and movable ends, said elements being arranged at opposite sides of the motion-receiving portion of said member and cooperating with said bellows to provide a substantially fixed pivot axis for said arm.

References Cited in the file of this patent

UNITED STATES PATENTS

| 2,024,571 | Gent | Dec. 17, 1935 |
| 2,221,942 | Carlson | Nov. 19, 1940 |
| 2,260,766 | Bjong | Oct. 28, 1941 |
| 2,453,324 | Jones et al. | Nov. 9, 1948 |
| 2,514,059 | Hicks et al. | July 4, 1950 |